United States Patent [19]

Hoch et al.

[11] Patent Number: 5,756,570
[45] Date of Patent: May 26, 1998

[54] ELECTRICAL GRADE POLYVINYL CHLORIDE RESIN COMPOSITION STABILIZED WITH A NON-LEAD STABILIZER

[75] Inventors: Samuel Hoch, Brooklyn, N.Y.; Michael H. Fisch, Wayne, N.J.

[73] Assignee: Witco Corporation, Greenwich, Conn.

[21] Appl. No.: 819,024

[22] Filed: Mar. 17, 1997

Related U.S. Application Data

[63] Continuation of Ser. No. 369,277, Jan. 5, 1995, abandoned, which is a continuation of Ser. No. 216,125, Mar. 22, 1994, abandoned, which is a continuation of Ser. No. 885,472, May 19, 1992, abandoned.

[51] Int. Cl.$^6$ .................................................. C08K 5/11
[52] U.S. Cl. ........................ 524/318; 524/430; 524/433
[58] Field of Search ................................. 524/318, 430, 524/433

[56] References Cited

U.S. PATENT DOCUMENTS

| | | |
|---|---|---|
| 4,132,691 | 1/1979 | Ejk ........................................ 524/178 |
| 4,221,687 | 9/1980 | Minagawa et al. ...................... 524/114 |
| 4,252,698 | 2/1981 | Ito et al. ................................ 524/567 |
| 4,447,569 | 5/1984 | Brecker et al. ......................... 524/297 |
| 5,326,638 | 7/1994 | Mottine, Jr. et al. .................... 428/379 |

*Primary Examiner*—Peter D. Mulcahy
*Attorney, Agent, or Firm*—Lockwood, Alex, FitzGibbon & Cummings

[57] ABSTRACT

An electrical grade polyvinyl chloride resin composition suitable for use as an electrical insulation material and avoiding the use of lead based stabilizers having a high volume resistivity when exposed to or immersed in water and a high resistance to deterioration when heated at temperatures above 100° C. is disclosed. The composition is composed of an electrical grade polyvinyl chloride resin, filler, carboxylic acid ester plasticizer, at least one heat stabilizer from which cadmium and lead are substantially excluded, and as a wet resistivity agent protecting against the effective of water, a defined amount of at least one alkaline earth metal oxide or hydroxide.

20 Claims, No Drawings

ELECTRICAL GRADE POLYVINYL CHLORIDE RESIN COMPOSITION STABILIZED WITH A NON-LEAD STABILIZER

This application is a continuation of application Ser. No. 08/369,277, non-abandoned filed on Jan. 5, 1995, which is a continuation of Ser. No. 08/216,125, now abandoned filed on Mar. 22, 1994, which is a continuation of Ser. No. 07/885,472, now abandoned filed May 19, 1992.

BACKGROUND OF THE INVENTION

Field of the Invention

This invention generally relates to polyvinyl chloride resin compositions used in formulation of electrical grade wire and cable insulation materials. Such compositions usually contain, in addition to an electrical grade polyvinyl chloride (PVC) resin, one or more plasticizers in order to render the composition flexible, a lubricant to assist in processing, one or more fillers, and one or more stabilizers. Such PVC compositions have a 50 years or more history of successful use world-wide, based on the ability of PVC manufacturers to provide electrical grade PVC resins having a high electrical resistivity, and on the discovery that certain lead compounds were outstanding stabilizers for such electrical grade PVC resins and thus afforded electrical grade PVC resin compositions characterized by excellent heat stability permitting rapid and economical processing at high temperatures without materially reducing electrical resistivity as measured by volume resistivity. Lead salts conventionally used as stabilizers in such PVC compositions well before 1960 and still used currently include inorganic lead salts, such as lead carbonate, lead orthosilicate, coprecipitated lead orthosilicate and silicate, tribasic lead sulfate, dibasic lead phosphate, white lead (mixture of the carbonate and hydroxide), lead salts of organic acids such as lead stearate, dibasic lead stearate, lead maleate, lead fumarate, lead tartrate, lead salicylate, dibasic lead phthalate, lead palmitate, lead laureate, lead abietate and the like; and commercial mixtures of neutral and basic salts such as are prepared by fusing together lead oxide and a suitable organic acid such as stearic, salicylic etc. A detailed description of electrical grade PVC resins and specifications therefor, and of compounding ingredients used therewith in formulating electrical grade PVC resin compositions, such as plasticizers, lubricants, and fillers, can be found in Brecker et al. U.S. Pat. No. 4,447,569 issued May 6, 1984 and need not be repeated here.

A serious drawback to the use of lead based stabilizers in electrical PVC compositions in spite of their outstanding characteristics in manufacture and use is the toxic and hazardous property of nearly every known lead compound. These hazards have long been a concern in the maintenance of safe working conditions where such stabilizers are manufactured and used in compounding electrical grade PVC compositions, and have been addressed by various techniques for altering the physical condition of powdery lead based stabilizers to make them less dusting or by introducing certain liquid lead compounds in place of the powdery lead based stabilizers, as disclosed, for example, in Brecker '569.

More recently, the concern about toxicological and hazardous characteristics of lead compounds has extended to the presumed behavior of such compounds when electrical grade PVC compositions stabilized therewith are discarded in municipal solid waste delivered to landfills and especially to incinerators. Under landfill conditions, the leachability of lead compounds from the organic polymer matrix of the electrical grade PVC composition may be minute or negligible, but incineration burns off the organic matrix and leaves a lead-containing ash believed to be leachable to the extent that costly handling according to the requirement of the Federal hazardous waste regulations would be necessary.

Accordingly, the conference of Northeastern state governors has mandated phasing out the use of lead compounds in all manufactured articles destined for eventual discard in municipal solid waste. It follows that, if PVC compositions continue to be used to insulate electric wire and cable, stabilizers not based on lead compounds will need to be provided.

A variety of materials have been used as stabilizers for the many different applications of PVC resin compositions other than electrical insulation. However, it is not to be expected that any existing PVC stabilizer would satisfy the demanding requirements of electrical resistivity, and indeed the search for a suitable non-lead replacement although in progress since at least 1975 has not reached the goal. In fact, experts have expressed doubts that the goal could be reached at all, based on an explanation of the chemistry underlying the stabilization of PVC with lead compounds.

Thus, in a chapter titled "Polyvinyl Chloride Processing Stabilizers: Lead and its Derivatives" in "Plastics Additives and Modifiers Handbook" (J. Edenbaum, ed; Van Nostrand Reinhold, New York 1992) pages 327–337, G. R. Atkinson writes (at page 331):

"In formulating electrical compounds, it is necessary that the compound be free of ionic impurities in order to maintain electrical properties. The main purpose of the stabilizer, in this application, is to ensure that the degradation products present are nonionic. This is the basic reason why lead stabilizers are the material of choice in these applications as lead chloride is a very water-insoluble nonionic compound. Other metallic stabilizers are less suitable since all of their resultant chlorides are more water soluble and conductive than lead-based materials."

Atkinson's statement is noteworthy among other considerations, for its focus on the influence of water in solubilizing and ionizing stabilizer degradation products such as lead chloride and other metallic chlorides. Resistivity of electrical insulation must, of course, be sufficient under both wet and dry conditions since insulation is exposed to water in many forms ranging from atmospheric humidity to broken water mains. It is well known that volume resistivity varies inversely with temperature and atmospheric humidity and resistivity measurements must therefore be made with test materials conditioned to a predetermined temperature and relative humidity. Moreover, experience has shown that the resistivity of existing electrical grade PVC resin compositions (predominantly stabilized with lead-based stabilizers) diminishes when immersed in water, whether in the form of test samples or finished insulated wire.

Prior Art

Thermoplastic processing of PVC has always required the inclusion of a stabilizer in the formulation in order to ensure satisfactory processing at economical rates of output without decomposition of the resin or objectionable changes in physical properties of the finished product. Beginning in the 1930's, there have accumulated over a thousand patent disclosures of various materials stated to be useful as stabilizers for PVC, including compounds of nearly every known metal and members of nearly every known class of organic compounds. For those materials that have been successfully commercialized and used for some time, the above-cited "Plastics Additives and Modifiers Handbook" and its chapters dealing with PVC stabilizers in such categories as lead stabilizers, organotin stabilizers, mixed-metal stabilizers, and so-called "non-toxic" stabilizers provide a ready reference with relevant bibliographic citations.

The coexistence in the marketplace of chemically disparate stabilizers implies that there is no such thing as one "best" stabilizer. It underscores the fact that even after generations of effort by workers in the field PVC stabilization remains an empirical art focused on the specific needs of the intended use of the PVC resin compositions being formulated, here PVC resin compositions used in the manufacture of electrical insulation.

The following disclosures may provide a more detailed appreciation of the state of the art.

V. Houska et al. U.S. Pat. No. 2,912,397, issued Nov. 10, 1959, discloses the use in an electrical grade PVC resin composition of an epoxidized fatty acid ester together with an otherwise conventional lead stabilizer and an unbleached clay. The latter is used in preference to washed and decolorized clays which were found disadvantageous owing to their alkalinity.

C. Canarios, U.S. Pat. No. 2,944,045 issued Jul. 5, 1960 discloses a stabilizer composition for PVC molding compositions suitable for photograph records. The stabilizer composition has a first component which is a barium or lead salt of higher fatty acid or a mixture of such barium and lead salts, and a second component which is one or more of barium, calcium, lead, or magnesium oxides. The only specifically disclosed stabilizer composition, stated to give optimum results, is a mixture of barium stearate, lead stearate and magnesium oxide. There is no mention of electrical grade PVC resin compositions or of any effect of water on any composition.

E. White et al., U.S. Pat. No. 3,824,202 issued Jul. 16, 1974 discloses a high temperature electrical PVC composition suitable for insulating wire with a higher thermal rating than the then highest standard rating of 105° C., in which the novel feature is the use of a Group IIA sulfate filler. The stabilizers included in White's compositions are defined as "lead-base" stabilizers, which are preferred, and certain non-lead stabilizers identified as organotin compounds such as dibutyltin-bis-isooctylthioglycolate and certain barium-cadmium complexes.

I. Sota and A. Koyama, Chemical Abstracts 1976, Volume 84, 5911S (Abstract of Japan Kokai 75 88162, dated 15 Jul., 1975) disclose vinyl chloride resin compositions for electrical insulation, containing PVC resin 100, magnesium oxide 2–10, and one or more low molecular weight polyhydric alcohol(s) and indoles 0.03 to 3 parts. These provide electrical insulation without the use of lead compounds. Thus, a 1 mm sheet molded from a composition of PVC 100, dioctylphthalate 50, calcium carbonate 30, calcined clay 5, magnesium oxide 1:4, zinc stearate 0.6, pentaerythritol 0.2, 2-phenylindole 0.1 and tristerile phosphate 0.1 parts had volume resistivity $9.03 \times 10^{13}$ ohm cm, compared with $3.74 \times 10^{13}$ and $5.52 \times 10^{13}$ for sheets from similar compositions with calcium stearate and magnesium stearate respectively replacing the magnesium oxide.

A 1979 pamphlet issued by ICI Americas Inc., Specialty Chemicals Division, Wilmington, Del. 19897 titled "TOPANOL® CA Antioxidant in Plasticizers for high temperature PVC Wire and Cable Insulation" discloses a variety of PVC wire and cable formulations but the only variable is the choice and level of plasticizer, all formulations being stabilized with 7 parts dibasic lead phthalate and 0.5 parts dibasic lead stearate per 100 parts of PVC.

Minagawa et al., U.S. Pat. No. 4,221,687 issued Sep. 9, 1980, discloses "environmentally acceptable" stabilized PVC compositions, meaning compositions from which the environmentally objectionable metals arsenic, cadmium, lead, mercury and thallium are substantially excluded, and, in order to overcome objectionable yellowing, there is included an "anti-yellowing composition" which comprises in combination (A) at least one basic inorganic compound of lithium, sodium, potassium, magnesium, calcium, strontium, barium, zinc, titanium, zirconium, or tin, and (B) a 1,3-diketone compound represented by the formula M(R-CO [R']-CO-R")n, in which R is a hydrocarbon group, an alkoxyhydrocarbon group or an alkylenedioxyhydrocarbon group having up to 18 carbon atoms; R' is a hydrogen atom, an acyl group R"'CO where R"' is alkyl or aryl, or a hydrocarbon group having up to 18 carbon atoms; R" is a hydrogen atom or a hydrocarbon group, a halohydrocarbon group, and alkoxyhydrocarbon group or an alkylenedioxyhydrocarbon group having up to 18 carbon atoms; M is hydrogen or a metal selected from the group consisting of lithium, sodium, potassium, magnesium, calcium, strontium, barium, zinc, aluminum and antimony; and n is an integer from 1 to 3 depending upon the valance of M. The basic inorganic compound can be, among many others, a hydroxide or an oxide of any of the specified metals. Volume resistivity (VR) data is included in two of the examples but nothing is explicit to identify the compositions measured as electrical grade PVC and nothing is said about the effect of water on these or any other compositions.

Brecker et al. U.S. Pat. No. 4,447,569 issued May 8, 1984 recapitulates the requirements for PVC electrical insulation and the lead stabilizers and other ingredients conventionally used in such PVC compositions, including the need to manage the work-place hazards of the conventional lead-based stabilizers resulting from their dusty powder character. Brecker also discloses a liquid lead alkylphenolate stabilizer offering a number of advantages, one of which is stated to be that compositions with liquid lead alkylphenolate stabilizers are less affected by water than similar compositions with solid lead stabilizers. Moreover, Brecker discloses data showing that addition of magnesium oxide at 5 phr and calcium hydroxide at 1 phr offers an improvement in VR, but the effect appears to be limited to "initial" VR, i.e. measurement before water immersion. Indeed, all compositions disclosed show some decrease in VR upon immersion in water.

SUMMARY OF THE INVENTION

In accordance with this invention, it has been found that an electrical grade polyvinyl chloride resin composition suitable for use as electrical insulation material and avoiding the use of lead-based stabilizers, having a high volume resistivity when exposed to or immersed in water and a high resistance to deterioration when heated at temperatures above 100° C. can be provided, consisting essentially of an electrical grade polyvinyl chloride resin and (in parts by weight per 100 parts by weight of the resin) from about 5 to about 25 parts filler; from about 30 to about 100 parts carboxylic acid ester plasticizer; from about 0.02 to about 10 parts of at least one heat stabilizer from which cadmium and lead are substantially excluded; and as a wet resistivity agent protecting against the effect of water, from about 0.1 to about 1 part of at least one alkaline earth metal oxide or hydroxide surprisingly, electrical grade polyvinyl chloride resin compositions in accordance with this invention can exhibit a greater volume resistivity than similar compositions containing a lead-based stabilizer, and can even exhibit a greater volume resistivity after being immersed in water for some time than prior to immersion.

DESCRIPTION OF PREFERRED EMBODIMENTS

The alkaline earth metal oxide or hydroxide that, when included in the composition of the invention at 0.1 to 1 part by weight per 100 parts by weight of resin (phr), protects the resin composition against the usually adverse effect of water and results in higher volume resistivity (VR), can be any one or more of barium hydroxide, barium oxide, calcium hydroxide, calcium oxide, magnesium hydroxide, magnesium oxide, strontium hydroxide, and strontium oxide. Combinations of two or more such oxides or hydroxides are particularly preferred giving an enhanced effect compared to that of a single agent used alone. When two or more such oxides or hydroxides are used together, the total amount of such combinations is in the range from 0.1 to 1.0 phr and the relative proportions are chosen such that each agent amounts to at least 5% and not more than 95% of the total.

For best results the indicated use levels of the wet resistivity agent should not be exceeded. At higher loadings adverse effects may be observed.

The electrical grade PVC resin used in compositions according to the invention must have a high electrical resistivity, which can be expressed in terms of VR as more than $10^{12}$ ohm cm measured in water at 60° C. Such resins are commercially available.

The filler used in compositions according to the invention can be any commercially available electrical grade filler including talc, calcium carbonate, clay, whiting, fuller's earth, magnesium silicate, barium sulfate, calcium sulfate, strontium sulfate, and titanium dioxide. Fillers can enhance VR by causing the composition to be stiffer than in the absence of filler, but at too high a filler use level the content of unavoidable ionic impurities can become excessive and vitiate the beneficial effect.

Electrical grade plasticizers are commercially available, manufactured with ionic impurities carefully controlled to the lowest possible levels. However, even the highest purity plasticizers diminish VR with increasing use levels. Preferred plasticizers are esters of carboxylic acids, for example diisodecyl phthalate, ditridecyl phthalate, tri-2-ethylhexyl trimellitate, and epoxidized soybean oil. For a comprehensive disclosure of suitable plasticizers reference can be had to Brecker U.S. Pat. No. 4,447,569 at column 4, line 47 to column 6, line 27 which is incorporated by reference.

Any known heat stabilizer can be used as the heat stabilizer in the electrical grade PVC composition according to this invention, provided two conditions are satisfied: first, that cadmium and lead are substantially excluded; and second, as required by the use of the expression "consisting essentially of" materials that substantially depreciate the favorable properties of the composition of the invention are also excluded. Thus, alkaline metal compounds, organic nitrogen and polyhydric alcohols which do diminish VR even at low use levels, are excluded.

Particularly preferred heat stabilizers include epoxide compounds (when not used as plasticizers); barium, calcium, magnesium and zinc salts of non-nitrogenous monocarboxylic acids; and certain organic adjuvents such as phenolic antioxidants, phosphite esters, and beta-diketones. Specifically, useful members of these categories of heat stabilizers include the following:

Epoxides: epoxidized soy bean oil, epoxidized 2-ethylhexyl tallate, 4,4'-isopropylidenebis(phenyl glycidyl ether).

Salts of monocarboxylic acids: barium laurate, barium stearate, barium benzoate, calcium stearate, calcium 3-methylbenzoate, calcium benzoate, magnesium benzoate, magnesium palmitate, magnesium stearate, zinc decanoate, zinc laurate, zinc myristate, and zinc stearate.

Phenolic antioxidants: 2,6-di-t-butyl-4-methylphenol (BHT), 4,4'-isopropylidenebisphenol, 1,1,3-tris(2'-methyl-4'-hydroxy-5'-t-butylphenylbutane, 4,4'-thio-bis(2-t-butyl-5-methylphenol).

Organic phosphites: triphenyl phosphite, isodecyl diphenyl phosphite, di-isodecyl phenyl phosphite.

Betadiketones: dibenzoylmethane, stearoylbenzoyl methane.

To satisfy the condition that cadmium and lead are substantially excluded from the composition of this invention, any compounds of cadmium or lead present as unavoidable contaminants should not exceed 0.001 phr expressed as lead in the finished compositions.

In addition to the above recited essential ingredients of the composition of this invention, the electrical grade PVC resin composition can include other conventional components such as flame retardants, for example, antimony trioxide, molybdic oxide and alumina hydrate; colorants such as titanium dioxide, iron oxides and carbon black; and lubricants such as stearic acid, mineral oils and low molecular weight polyethylenes.

Widely available existing equipment and conventional techniques are adequate to prepare electrical grade PVC resin compositions according to this invention and process such compositions into finished electrical insulation on conductors. The wet resistivity protective agents according to this invention, which are inorganic solids, are conveniently pre-blended with organic solid ingredients of the composition of this invention such as the heat stabilizers, for example, zinc stearate and calcium stearate, in suitable proportions to provide more or less complete additive packages that minimize the number of weighings required and facilitate the homogenous dispersion of the alkaline earth oxides and hydroxides in the formulation. Where convenient, such additive packages can also include optional ingredients such as lubricants, colorants, and flame retardants as well as a small portion of the PVC resin.

The preparation of the electrical grade PVC resin composition is easily accomplished by conventional procedures. The ingredients are blended with the PVC resin, using for example a two-roll mill at a temperature at which the mix is sufficiently fluid, milling the resin composition including plasticizer and other ingredients at from 120° to 190° C. long enough to form a homogenous mass, typically five minutes, and sheeting it off or extruding the mass onto the wire or cable as the insulation sheath.

For a description of the process of extruding the PVC resin composition on wire, reference can be had to Brecker U.S. Pat. No. 4,447,569 at column 7, line 44 to column 9, line 21 which is included by reference.

The following examples in the opinion of the inventors represent preferred embodiments to illustrate without limiting the scope of the invention.

EXAMPLES 1–6

A series of electrical grade plasticized polyvinyl chloride resin compositions was prepared, having the following formulation:

| Ingredient | |
|---|---|
| Electrical Grade of vinyl chloride of homopolymer (Geon ® 102EP) | 100 parts |
| Electrical grade diisodecyl phthalate plasticizer (note 1) | 55 parts |
| Stearic acid, lubricant | 0.5 |
| Calcium carbonate (Atomite ®) | 20.0 |
| Clay (Glomax ® LL) | 10.0 |
| Stabilizer (see Table 1 below) | Variable |
| Wet resistivity protective agent (see Table 1 below) | Variable |

Samples of each composition were milled 3 minutes on a two-roll mill at 170° C. to provide sheets which were then pressed into circular plaques approximately 1.25 mm thick. The plaques were conditioned overnight in a humidity chamber controlled to 55∓5 percent relative humidity. In the water immersion test, the plaques were immersed in the deionized water for 7 days at 50°-55° C., wiped dry and conditioned overnight in the humidity chamber at 55∓5 percent RH. A Keithley Model 610C Electrometer and Resistivity Fixture RF-100 were used to measure volume resistivity (VR). The following Table 1 shows the quantities of stabilizers and what resistivity protective agents in each composition and the VR measurements before and after water immersion.

TABLE 1

| Ingredient | Lead Control | EX 1 | EX 2 | EX 3 |
|---|---|---|---|---|
| Tribasic Lead Sulfate | 7.0 | | | |
| Barium Stearate | | 3.0 | 3.0 | 3.0 |
| Zinc Stearate | | | | 0.5 |
| BHT Antioxidant | | | | 1.0 |
| Diphenyl Isodecyl Phosphite | | | | 1.0 |
| Titanium Dioxide | | | | 2.0 |
| Magnesium Oxide | | 0.5 | | |
| Barium Oxide | | | 0.5 | 0.5 |
| VR before immersion ohm cm × 10 exp 13 | 9.6 | 4.2 | 11.4 | .5 |
| % of lead control | | 44 | 119 | 47 |
| VR after immersion oh cm × 10 exp 13 | 2.2 | 1.0 | 46.4 | 25.4 |
| % of lead control | | 45 | 2110 | 1150 |

| | EX 4 | EX 5 | EX 6 |
|---|---|---|---|
| Tribasic Lead Sulfate | 7.0 | | |
| Barium Stearate | 3.0 | 3.0 | 3.0 |
| Zinc Stearate | 0.5 | 0.5 | 0.5 |
| BHT Antioxidant | 1.0 | 1.0 | 1.0 |
| Diphenyl Isodecyl Phosphite | 1.0 | 1.0 | 1.0 |
| Titanium Dioxide | 2.0 | 2.0 | 2.0 |
| Magnesium Oxide | 0.5 | 0.5 | 0.5 |
| Barium Oxide | 0.2 | 0.1 | 0.5 |
| VR before immersion ohm cm × 10 exp 13 | 9.6 | 1.6 | 1.4 | .4 |
| % of lead control | 17 | 15 | 46 |
| VR after immersion ohm cm × 10 exp 13 | 2.2 | 24.4 | 9.5 | 1.4 |
| % of lead control | 1110 | 432 | 64 |

The results show that the VR of the lead-stabilized control is diminished upon water immersion, as is well known. In contrast, compositions according to this invention, particularly, Examples 2, 3, 4 and 5, exhibit dramatically different behavior. After immersion, VR is much greater than before immersion, and is at least equal and sometimes much greater than the VR of the lead-stabilized control before immersion.

EXAMPLES 7-9

Electrical grade plasticized PVC resin compositions were prepared, using the same formulation and conditions as in Examples 1–6 above. The quantities of stabilizers and wet resistivity protective agents included in each composition as well as VR measurements before and after water immersion are shown in Table 2 below.

TABLE 2

| Ingredient | Lead Control | EX 7 | EX 8 | EX 9 |
|---|---|---|---|---|
| Tribasic Lead Sulfate | 7.0 | | | |
| Barium Stearate | | 3.0 | 3.0 | 3.0 |
| Zinc Stearate | | 0.5 | 0.5 | 0.5 |
| BHT Antioxidant | | 1.0 | 1.0 | 1.0 |
| Diphenyl Isodecyl Phosphite | | 1.0 | | |
| Titanium Dioxide | | 1.8 | 1.8 | 1.8 |
| Dibenzoyl Methane | | 0.2 | 0.2 | 0.3 |
| Magnesium Oxide | | 0.5 | 0.5 | 0.5 |
| Barium Oxide | | 0.1 | 0.1 | 0.1 |
| VR before immersion ohm cm × 10 exp 13 | 18.3 | 1.3 | 0.7 | 0.7 |
| % of lead control | | 7.1 | 3.8 | 3.8 |
| VR after immersion ohm cm × 10 exp 13 | 4.8 | 3.6 | 8.6 | 9.7 |
| % of lead control | | 75 | 179 | 202 |

These results show that water immersion decreases VR of the lead stabilized control by a factor of about 4 while water immersion of the compositions of Example 7–9 according to this invention is dramatically increased by a factor of about 3 to as much as 10.

EXAMPLE 10–16

Electrical grade plasticized PVC compositions were prepared, using the same formulations and conditions as in the preceding examples. The quantities of stabilizers and wet resistivity protective agents present in each composition and the results of VR measurements before and after water immersion are shown in Table 3 below.

TABLE 3

| Ingredient | Lead Control | EX 10 | EX 11 | EX 12 |
|---|---|---|---|---|
| Tribasic Leadsulfate | 7.0 | | | |
| Barium Stearate | | 3.0 | | 3.0 |
| Zinc Stearate | | | | 0.5 |
| Calcium Stearate | | | 5.0 | |
| BHT Antioxidant | | | | 1.0 |
| Diphenyl Isodecyl Phosphite | | | | 1.0 |
| Titanium Dioxide | | | | 2.0 |
| Dibenzoyl Methane | | | | |
| Calcium Oxide | | 0.5 | 0.5 | 0.5 |
| Magnesium Oxide | | | | 0.5 |
| VR before immersion ohm cm × 10 exp 13 | 15.3 | 1.2 | 0.9 | 1.1 |
| % of lead control | | 7.8 | 5.9 | 7.2 |
| VR after immersion ohm cm × 10 exp 13 | 4.5 | 3.1 | 4.1 | 4.8 |
| % of lead control | | 69 | 91 | 107 |

| | EX 13 | EX 14 | EX 15 | EX 16 |
|---|---|---|---|---|
| Tribasic Lead Sulfate | 7.0 | | | |
| Barium Stearate | 3.0 | | | |
| Zinc Stearate | 0.5 | 0.5 | 0.5 | 0.5 |

TABLE 3-continued

| Ingredient | Lead Control | | | |
|---|---|---|---|---|
| Calcium Stearate | | 3.0 | 3.0 | 3.0 |
| BHT Antioxidant | 1.0 | 1.0 | 1.0 | 1.0 |
| Diphenyl Isodecyl Phosphite | 1.0 | 1.0 | 1.0 | 1.0 |
| Titanium Dioxide | | 2.0 | 2.0 | 1.7 |
| Dibenzoyl Methane | | | | 0.3 |
| Calcium Oxide | | 0.2 | 0.5 | 0.2 | 0.5 |
| Magnesium Oxide | | 0.5 | 0.5 | 0.5 | 0.5 |
| VR before immersion ohm cm × 10 exp 13 | 15.3 | 1.2 | 0.8 | 0.9 | 0.5 |
| % of lead control | | 7.8 | 5.2 | 5.9 | 3.3 |
| VR after immersion ohm cm × 10 exp 13 | 4.5 | 4.6 | 7.4 | 5.5 | 6.6 |
| % of lead control | | 102 | 164 | 122 | 147 |

It can be seen that, as a result of including a calcium oxide or calcium and magnesium oxide wet resistivity protective agent, the volume resistivity of the compositions of Example 10–16 according to this invention is increased to three or more times the initial volume resistivity.

EXAMPLES 17–24

Electrical grade plasticized PVC resin compositions were prepared, using the same formulations and conditions as in the preceding examples. The quantities of titanium dioxide colorant, stabilizers and wet resistivity protective agents included in each composition and the results of VR measurements before and after water immersion are shown in Table 4 below.

TABLE 4

| Ingredient | Lead Control | EX 17 | EX 18 | EX 19 | EX 20 |
|---|---|---|---|---|---|
| Tribasic Lead Sulfate | 7.0 | | | | |
| Barium Stearate | | 3.0 | 3.0 | 3.0 | 3.0 |
| Calcium Stearate | | | | | |
| Zinc Stearate | | 0.5 | 0.5 | 0.5 | 0.5 |
| BHT Antioxidant | | 1.0 | 1.0 | 1.0 | 1.0 |
| Diphenyl Isodecyl Phosphite | | 1.0 | 1.0 | | |
| Titanium Dioxide | | 2.0 | 2.0 | 1.8 | 1.8 |
| Dibenzoyl Methane | | | | 0.2 | 0.2 |
| Magnesium Oxide | | 0.5 | 0.5 | 0.5 | 0.5 |
| Barium Hydroxide | | 0.2 | 0.1 | 0.2 | 0.1 |
| Calcium Hydroxide | | | | | |
| VR before immersion ohm cm × 10 exp 13 | 8.0 | 2.0 | 1.7 | 0.5 | 0.6 |
| % of lead control | | 25 | 21 | 6 | 8 |
| VR after immersion ohm cm × 10 exp 13 | 8.0 | 38.3 | 27.4 | 59.1 | 17.8 |
| % of lead control | | 479 | 343 | 739 | 223 |

| Ingredient | | EX 21 | EX 22 | EX 23 | EX 24 |
|---|---|---|---|---|---|
| Tribasic Lead Sulfate | 7.0 | | | | |
| Barium Stearate | | | | | |
| Calcium Stearate | | 3.0 | 3.0 | 3.0 | 3.0 |
| Zinc Stearate | | 0.5 | 0.5 | 0.5 | 0.5 |
| BHT Antioxidant | | 1.0 | 1.0 | 1.0 | 1.0 |
| Diphenyl Isodecyl Phosphite | | 1.0 | 1.0 | | |
| Titanium Dioxide | | 2.0 | 2.0 | 1.8 | 1.8 |
| Dibenzoyl Methane | | | | 0.2 | 0.2 |
| Magnesium Oxide | | 0.5 | 0.5 | 0.5 | 0.5 |
| Barium Hydroxide | | | | | |
| Calcium Hydroxide | | 0.5 | 0.2 | 0.5 | 0.2 |
| VR before immersion ohm cm × 10 exp 13 | 8.0 | .8 | 0.8 | 0.6 | 2.3 |
| % of lead control | | 10 | 10 | 8 | 29 |
| VR after immersion ohm cm × 10 exp 13 | 8.0 | 5.5 | 3.9 | 17.2 | 9.2 |
| % of lead control | | 69 | 49 | 215 | 115 |

As a result of including a magnesium oxide and barium hydroxide or a magnesium oxide and calcium hydroxide wet resistivity protective agent, compositions of Examples 17–24 according to this invention are seen to increase in VR upon immersion by a factor of at least five and as much as 118.

What is claimed is:

1. An electrical grade polyvinyl chloride resin composition suitable for use as an electrical insulation material, having a high volume resistivity when wet and a high resistance to deterioration when heated at temperatures above 100° C., said composition consisting essentially of:
    (a) a polyvinyl chloride resin, and
    (b) in parts per 100 parts of resin,
        (1) from about 30 to about 100 parts carboxylic acid ester plasticizer,
        (2) at least about 5 parts filler,
        (3) from about 0.02 to about 10 parts of at least one heat stabilizer from which cadmium and lead are substantially excluded, said stabilizer being selected from the group consisting of epoxides, tin free salts of monocarboxylic acids, phenolic antioxidants, organic phosphites and mixtures thereof which are substantially free of cadmium and lead, and
        (4) a protective agent which increases the volume resistivity of the polyvinyl chloride when the polyvinyl chloride is exposed to water of from about 0.1 to about 1 part of at least one inorganic alkaline earth metal oxide or hydroxide or mixture thereof.

2. The composition of claim 1 wherein said heat stabilizer is selected form the group consisting of barium stearate, zinc stearate and mixtures thereof.

3. The composition of claim 2 wherein said alkaline earth metal oxide or hydroxide is selected from the group consisting of barium hydroxide, barium oxide, calcium hydroxide, calcium oxide, magnesium hydroxide, magnesium oxide, strontium hydroxide, strontium oxide, and mixtures thereof.

4. The composition of claim 3 wherein said alkaline earth metal oxide or hydroxide is selected from the group consisting of magnesium oxide, barium oxide, and mixtures thereof.

5. The composition of claim 3 wherein said alkaline earth metal oxide or hydroxide is selected from the group consisting of calcium oxide, magnesium oxide, and mixtures thereof.

6. The composition of claim 3 wherein said alkaline earth metal oxide or hydroxide is selected from the group consisting of magnesium oxide, barium hydroxide and mixtures thereof.

7. The composition of claim 3 wherein said alkaline earth metal oxide or hydroxide is selected from magnesium oxide, calcium hydroxide and mixtures thereof.

8. The composition of claim 3 wherein said alkaline earth metal oxide or hydroxide is barium oxide and said barium oxide is present in the amount of about 0.5 parts per 100 parts of said resin.

9. The composition of claim 3 wherein said alkaline earth metal oxide or hydroxide comprises a mixture of magnesium oxide and barium oxide in a ratio of 5:1 to 1:1.

10. The composition of claim 3 wherein said alkaline earth metal oxide or hydroxide comprises a mixture of magnesium oxide and barium hydroxide in a ratio of 5:1 to about 1:1.

11. A method for providing high volume resistivity to an electrical grade polyvinyl chloride resin composition, said composition consisting essentially of:

(a) polyvinyl chloride resin, and
(b) in parts per 100 parts of resin,
   (1) from about 30 to about 100 parts carboxylic acid ester plasticizer,
   (2) at least about 5 parts filler, and
   (3) from about 0.2 to about 10 parts of at least one heat stabilizer from which calcium and lead are substantially excluded, said stabilizer being selected from the group consisting of epoxides, tin free salts of monocarboxylic acids, phenolic antioxidants, organic phosphites and mixtures thereof which are substantially free of cadmium and lead;

said method comprising the step of incorporating a protective agent which increases the volume resistivity of the polyvinyl chloride when the polyvinyl chloride is exposed to water of from about 0.1 to about 1 part of at least one inorganic alkaline earth metal oxide or hydroxide or mixture thereof into said resin composition.

12. The composition of claim 11 wherein said heat stabilizer is selected form the group consisting of barium stearate, zinc stearate and mixtures thereof.

13. The composition of claim 12 wherein said alkaline earth metal oxide or hydroxide is selected from the group consisting of barium hydroxide, barium oxide, calcium hydroxide, calcium oxide, magnesium hydroxide, magnesium oxide, strontium hydroxide, strontium oxide, and mixtures thereof.

14. The composition of claim 13 wherein said alkaline earth metal oxide or hydroxide is selected from the group consisting of magnesium oxide, barium oxide, and mixtures thereof.

15. The composition of claim 13 wherein said alkaline earth metal oxide or hydroxide is selected from the group consisting of calcium oxide, magnesium oxide, and mixtures thereof.

16. The composition of claim 13 wherein said alkaline earth metal oxide or hydroxide is selected from the group consisting of magnesium oxide, barium hydroxide and mixtures thereof.

17. The composition of claim 13 wherein said alkaline earth metal oxide or hydroxide is selected from magnesium oxide, calcium hydroxide and mixtures thereof.

18. The composition of claim 13 wherein said alkaline earth metal oxide or hydroxide is barium oxide and said barium oxide is present in the amount of about 0.5 parts per 100 parts of said resin.

19. The composition of claim 13 wherein said alkaline earth metal oxide or hydroxide comprises a mixture of magnesium oxide and barium oxide in a ratio of 5:1 to 1:1.

20. The composition of claim 13 wherein said alkaline earth metal oxide or hydroxide comprises a mixture of magnesium oxide and barium hydroxide in a ratio of 5:1 to about 1:1.

* * * * *